US012791317B2

(12) United States Patent
Stephens et al.

(10) Patent No.: US 12,791,317 B2
(45) Date of Patent: Nov. 10, 2026

(54) TECHNIQUES FOR USING A SERIES OF MAGNETIC MEASUREMENTS TO AIDE POSITION DETERMINATION

(71) Applicant: Honeywell International Inc., Charlotte, NC (US)

(72) Inventors: Trevor Keith Stephens, Maple Grove, MN (US); Hunter Staack, Golden Valley, MN (US); Sally Ann Keyes-Edwards, Issaquah, WA (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 22 days.

(21) Appl. No.: 18/818,189

(22) Filed: Aug. 28, 2024

(65) Prior Publication Data

US 2026/0063425 A1 Mar. 5, 2026

(51) Int. Cl.
*G01C 21/08* (2006.01)
*G01C 21/00* (2006.01)

(52) U.S. Cl.
CPC ........... *G01C 21/08* (2013.01); *G01C 21/005* (2013.01)

(58) Field of Classification Search
CPC .............................. G01C 21/08; G01C 21/005
See application file for complete search history.

(56) References Cited

U.S. PATENT DOCUMENTS 4,710,708 A * 12/1987 Rorden ................. G01S 5/0205 324/207.26
5,444,669 A * 8/1995 Polvani ................... F41G 9/008 114/21.3
5,558,091 A * 9/1996 Acker ................ G01R 33/0206 324/207.13
5,684,396 A * 11/1997 Aks ........................ G01V 3/081 324/207.13
5,850,625 A * 12/1998 Maren ..................... G01S 13/86 702/179

(Continued)

OTHER PUBLICATIONS

Li et al., "Geodesic-Based Method for Improving Matching Efficiency of Underwater Terrain Matching Navigation", Sensors Special Issue Multi-Sensor Systems for Positioning and Navigation, Jun. 16, 2019, vol. 19, No. 2709, pp. Title Page through 13.

(Continued)

*Primary Examiner* — Mussa A Shaawat
(74) *Attorney, Agent, or Firm* — Fogg & Powers LLC

(57) ABSTRACT

Techniques are provided for generating more accurate aiding data from magnetic anomaly measurements to aid in determining geographic position of a body. The following data is acquired: a series of more than one magnetic anomaly measurement (e.g., made with a magnetometer), a corresponding time of each magnetic anomaly measurement, and a vector distance between each successive magnetic anomaly measurement. With a single magnetic anomaly measurement, more than one geographic location on the magnetic anomaly map may be identified. As the number of magnetic anomaly measurements increases, a number of geographic locations diminishes eventually to a single geographic location on a magnetic anomaly map. Once determined, the single geographic location and a time is transmitted to a navigation filter.

20 Claims, 4 Drawing Sheets

(56) References Cited

U.S. PATENT DOCUMENTS 6,269,324 B1* 7/2001 Rakijas .................. G01V 3/081 324/207.13
6,539,327 B1* 3/2003 Dassot .................. G01V 3/081 702/152
7,834,621 B2 11/2010 Anderson
9,410,814 B2* 8/2016 Curtis .................. H04W 4/029
10,354,292 B1* 7/2019 Doshi .................. G06F 16/9535
10,648,814 B2* 5/2020 Hardt .................. B64C 19/00
10,852,444 B2* 12/2020 Pighin .................. G01S 19/073
11,624,611 B1* 4/2023 Vosburgh .................. G01C 21/1654 33/354
11,675,087 B2* 6/2023 Vosburgh .................. G01C 21/08 342/357.28
11,680,802 B2* 6/2023 Toutov .................. G01C 21/3859 701/449
11,977,832 B2* 5/2024 Duggan .................. G06F 16/29
12,078,486 B1* 9/2024 Keyes .................. G01C 21/08
12,196,873 B1* 1/2025 Pratt .................. G01C 21/28
2007/0080682 A1* 4/2007 Govari .................. G01R 33/09 324/247
2009/0043504 A1* 2/2009 Bandyopadhyay ..... G01S 19/49 701/469
2012/0143495 A1* 6/2012 Dantu .................. G01C 21/206 455/457
2012/0232838 A1* 9/2012 Kemppi .................. G01C 21/206 702/150
2014/0365124 A1* 12/2014 Vulcano .................. G01C 21/3617 707/706
2015/0018018 A1* 1/2015 Shen .................. G01C 21/005 455/457
2015/0168153 A1* 6/2015 Hsu .................. G01B 7/003 701/469
2016/0109233 A1* 4/2016 Morrison .................. G01C 9/005 701/4
2016/0187142 A1* 6/2016 Larsen .................. G01P 15/14 701/500
2017/0074660 A1* 3/2017 Gann .................. B64D 43/00
2017/0075020 A1* 3/2017 Gann .................. G01C 21/08
2020/0304948 A1* 9/2020 Bourland .................. G01B 7/004
2021/0215484 A1* 7/2021 Keyes .................. G01C 25/005
2021/0396524 A1* 12/2021 Toutov .................. G01C 21/1654
2022/0026212 A1* 1/2022 Toutov .................. G01C 21/3841
2023/0349698 A1* 11/2023 Toutov .................. G01S 19/48
2024/0085182 A1* 3/2024 Morton .................. G01C 21/08
2024/0118080 A1* 4/2024 Vosburgh .................. G01C 21/1654
2024/0167819 A1* 5/2024 Toutov .................. G01C 21/3859
2024/0345185 A1* 10/2024 Puckett .................. H01S 3/0912
2025/0056235 A1* 2/2025 Toutov .................. G01R 17/04
2025/0116785 A1* 4/2025 Toutov .................. G01S 19/47
2025/0123339 A1* 4/2025 Bao .................. G01R 33/0206
2025/0306135 A1* 10/2025 Wu .................. G01R 33/26

OTHER PUBLICATIONS

Li et al., "Terrain Matching Positioning Method Based on Node Multi-information Fusion" (Abstract only), the Journal of Navigation, vol. 70, Issue 1, Jul. 8, 2016, pp. 1 through 7.
Liu et al., "Comprehensive Features Matching Algorithm for Gravity Aided Navigation", IEEE Geoscience and Remote Sensing Letters, vol. 19, Jan. 2022, as downloaded Aug. 3, 2022 from IEEE Xplore, pp. 1 through 6.
Raquet et al., "Determining Absolute Position Using 3-Axis Magnetometers and the Need for Self-Building World Models" (2013), as downloaded Jul. 2, 2024 from https://www.sto.nato.int/publications/STO%20Educational%20Notes/STO-EN-SET-197/STO-EN-SET-197-04.pdf, pp. 4-1 through 4-16.
Wu et al., "Performance Evaluation and Analysis for Gravity Matching Aided Navigation", Sensors Special Issue Marine Sensing, Apr. 5, 2017, vol. 17, No. 769, pp. Title Page through 15.
European Patent Office, "Extended European Search Report", dated Jan. 30, 2026, from EP Application No. 25193889.0, from Foreign Counterpart to U.S. Appl. No. 18/818/189, pp. 1 through 10, Published EP.

* cited by examiner

TECHNIQUES FOR USING A SERIES OF MAGNETIC MEASUREMENTS TO AIDE POSITION DETERMINATION

BACKGROUND

A global navigation satellite system (GNSS), for example Global Positioning System (GPS), emits signals which a GNSS receiver, of a vehicle, uses to ascertain a geographic position of the vehicle. GNSS signals are susceptible to jamming and/or spoofing. Therefore, a system is necessary to determine geographic position of the vehicle in the presence of jamming and/or spoofing.

In the absence of reliable GNSS signals, the geographic position of the vehicle may be determined alternatively. Magnetic anomaly measurements, a magnetic anomaly map, and data from an inertial measurement unit may be utilized by a navigation filter at successive time instances. The magnetic anomaly measurement at each time instance is used to aid position determination at the time instance in conjunction with the measurement(s) from the inertial measurement unit.

The navigation filter compares a magnetic anomaly measurement at a time instance to a magnetic anomaly map, and determines a geographic location on the magnetic anomaly map corresponding to the magnetic anomaly measurement. Such geographic location is used to aid determination of the geographic position of the vehicle.

This technique, however, is susceptible to error because the navigation filter uses a single magnetic measurement to determine a single geographic location on the magnetic anomaly map. The single geographic location, generated in the foregoing way, may be erroneous because the magnetic anomaly field strength may be substantially the same for two or more adjacent geographic locations. As a result, the geographic position generated by the navigation filter may also be incorrect.

SUMMARY OF THE INVENTION

In some aspects, the techniques described herein relate to a method of utilizing a magnetic anomaly measurement to aid in determining a geographic position of a body, the method including: receiving a first magnetic measurement and a first time when the first magnetic measurement was made; generating a set of at least one geographic location on a magnetic anomaly map, wherein the set includes each geographic location on the magnetic anomaly map which has a magnetic field strength within a threshold range of the first magnetic measurement; determining whether the set or another set of at least one geographic location, on the magnetic anomaly map, includes more than one geographic location; determining that the set of at least one geographic location includes the more than one geographic location, then receiving another magnetic measurement and another time when the other magnetic measurement was made; determining a vector distance travelled by the body, between where the other magnetic measurement was made and where the magnetic measurement immediately preceding the other magnetic measurement was made; for each geographic location of a last determined set of at least one geographic location, determining an offset geographic position on the magnetic anomaly map by adding the vector distance to each geographic location of the last determined set of at least one geographic location; generating the other set of at least one offset geographic location on the magnetic anomaly map, wherein the other set includes each offset geographic location on the magnetic anomaly map which has a magnetic field strength within the threshold range of the other magnetic measurement; and determining that the set of at least one geographic location does not include the more than one geographic location, then transmitting, to a navigation filter, only one geographic location in the set or the other set and a time.

In some aspects, the techniques described herein relate to a program product including a non-transitory processor readable medium on which program instructions are embodied, wherein the program instructions are configured, when executed by at least one programmable processor, to cause the at least one programmable processor to execute a process to utilize a magnetic anomaly measurement to aid in determining a geographic position of a body, the process including: receiving a first magnetic measurement and a first time when the first magnetic measurement was made; generating a set of at least one geographic location on a magnetic anomaly map, wherein the set includes each geographic location on the magnetic anomaly map which has a magnetic field strength within a threshold range of the first magnetic measurement; determining whether the set or another set of at least one geographic location, on the magnetic anomaly map, includes more than one geographic location; determining that the set of at least one geographic location includes the more than one geographic location, then receiving another magnetic measurement and another time when the other magnetic measurement was made; determining a vector distance travelled by the body, between where the other magnetic measurement was made and where the magnetic measurement immediately preceding the other magnetic measurement was made; for each geographic location of a last determined set of at least one geographic location, determining an offset geographic position on the magnetic anomaly map by adding the vector distance to each geographic location of the last determined set of at least one geographic location; generating the other set of at least one offset geographic location on the magnetic anomaly map, wherein the other set includes each offset geographic location on the magnetic anomaly map which has a magnetic field strength within the threshold range of the other magnetic measurement; and determining that the set of at least one geographic location does not include the more than one geographic location, then transmitting, to a navigation filter, only one geographic location in the set or the other set and a time.

In some aspects, the techniques described herein relate to an apparatus for utilizing a magnetic anomaly measurement to aid in determining a geographic position of a body, the apparatus including: a magnetometer; an inertial measurement unit; a time source; and a processing circuitry; wherein the processing circuitry is configured to store a navigation filter and a magnetic anomaly map; wherein the processing circuitry is communicatively coupled to the time source, the magnetometer, and the inertial measurement unit; wherein the processing circuitry is configured to: receive a first magnetic measurement from the magnetometer and a first time from the time source when the first magnetic measurement was made; generate a set of at least one geographic location on the magnetic anomaly map, wherein the set includes each geographic location on the magnetic anomaly map which has a magnetic field strength within a threshold range of the first magnetic measurement; determine whether the set or another set of at least one geographic location, on the magnetic anomaly map, includes more than one geographic location; determine that the set of at least one geographic location includes the more than one geographic location, then receiving another magnetic measurement from the magnetometer and another time, from the time source, when the other magnetic measurement was made; determine a vector distance travelled by the body, between where the other magnetic measurement was made and where the magnetic measurement immediately preceding the other magnetic measurement was made; for each geographic location of a last determined set of at least one geographic location, determine an offset geographic position on the magnetic anomaly map by adding the vector distance to each geographic location of the last determined set of at least one geographic location; generate the other set of at least one offset geographic location on the magnetic anomaly map, wherein the other set includes each offset geographic location on the magnetic anomaly map which has a magnetic field strength within the threshold range of the other magnetic measurement; and determine that the set of at least one geographic location does not include the more than one geographic location, then transmitting, to the navigation filter, only one geographic location in the set or the other set and a time from the time source.

BRIEF DESCRIPTION OF THE DRAWINGS

Comprehension of embodiments of the invention is facilitated by reading the following detailed description in conjunction with the annexed drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Techniques are provided for generating more accurate aiding data from magnetic anomaly measurements to aid in determining geographic position of a body. The following data is acquired: a series of more than one magnetic anomaly measurement (e.g., made with a magnetometer), a corresponding time of each magnetic anomaly measurement, and a vector distance between each successive magnetic anomaly measurement. With a single magnetic anomaly measurement, more than one geographic location on the magnetic anomaly map may be identified. As the number of magnetic anomaly measurements increases, the number of geographic locations diminishes eventually to a single geographic location on a magnetic anomaly map. Once determined, the single geographic location and a time is transmitted to a navigation filter. Using the single geographic location, the time, and other data from other navigation device(s), a geographic position of a body is determined. Because the aforementioned technique more accurately determines a geographic location of the body on the magnetic anomaly map, the navigation filter more accurately determines the geographic position of the body. Thus, embodiments of the invention are an improvement to navigation technology utilizing magnetic anomaly measurements.

Figure 1:
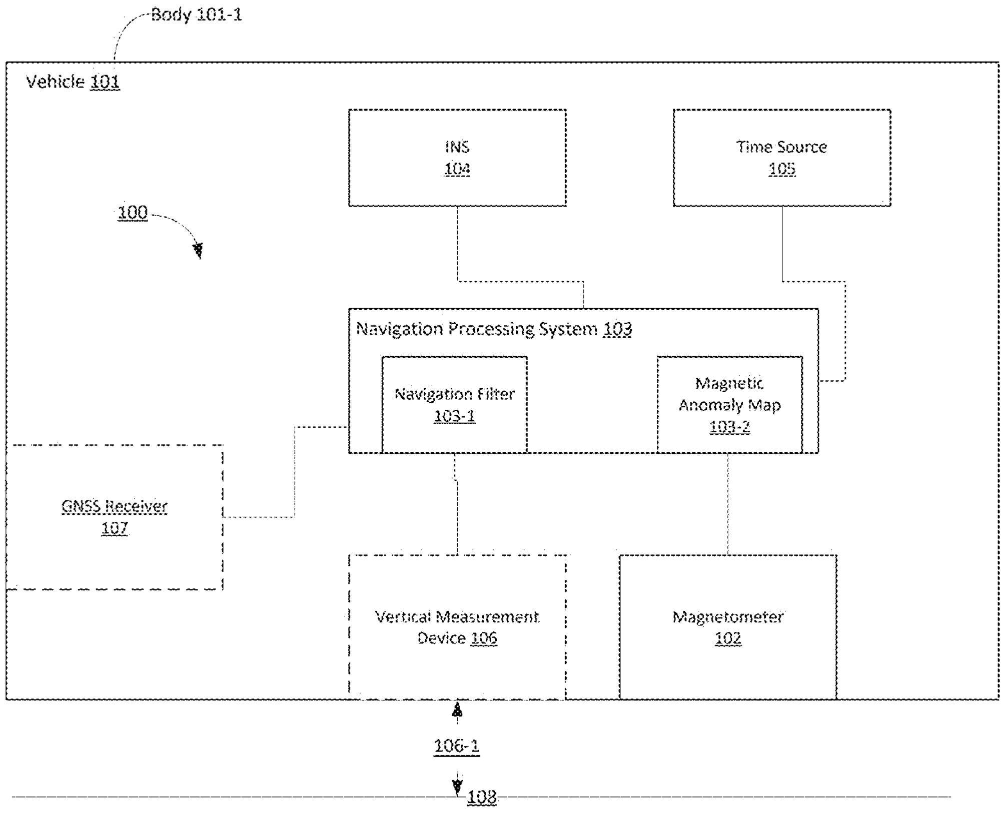
FIG. 1 illustrates a block diagram of one embodiment of a geographic position determining system for determining a geographic position of a body according to embodiment of the invention.

FIG. 1 illustrates a block diagram of one embodiment of a geographic position determining system 100 for determining a geographic position of a body 101-1 according to embodiment of the invention. The body 101-1 may be a body of a vehicle, a human, an animal, or any other thing. The vehicle may be an airborne vehicle, a land vehicle, a waterborne vehicle, or any other type of vehicle. For pedagogical purposes, the body is illustrated herein as a body 101-1 of a vehicle 101.

The geographic position determining system 100 includes a magnetometer 102, a navigation processing system (or navigation processing circuitry) 103, an inertial navigation system (INS) 104, and a time source (or time source circuitry) 105. The time source 105 is configured to measure time, e.g., in the absence of reliable (i.e., accurate) data from the GNSS receiver which would normally provide time. Optionally, the time source 105 is an atomic clock, crystal oscillator (e.g., a temperature stabilized crystal oscillator), or any other time source other than a GNSS receiver. Optionally, the time source 105 may be part of the INS 104.

Optionally, the geographic position determining system 100 includes a GNSS receiver 107. The optional GNSS receiver 107 is configured to be communicatively coupled to the navigation processing system 103 and to provide geographic position data and/or time data to the navigation processing system 103, e.g., a navigation filter. If the geographic position determining system 100 includes the optional GNSS receiver 107, then optionally the time source is configured to measure time starting from the last know good time received from the optional GNSS receiver. The optional GNSS receiver 107 may be a receiver for GPS, Global Navigation Satellite System (GLONASS), BeiDou navigation satellite system, Galileo satellite navigation system, Indian regional navigation satellite system, and/or any other navigation satellite system. The optional GNSS receiver 107 may be utilized in embodiments of the invention when not spoofed or jammed.

Figure 2:
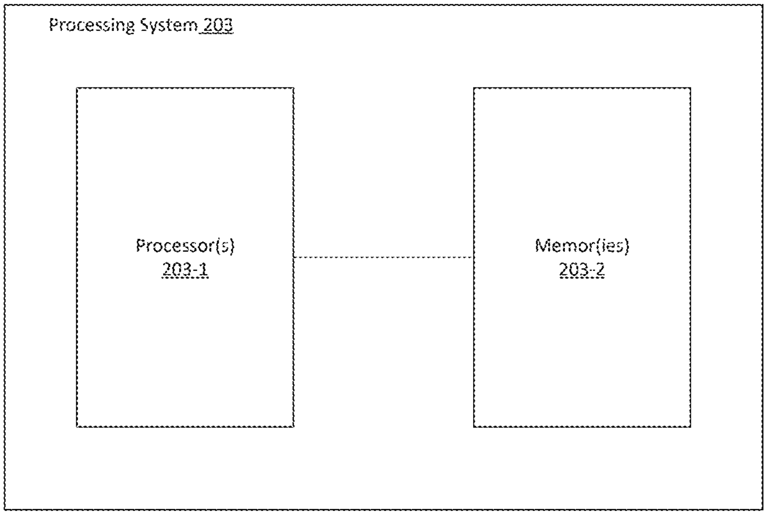
FIG. 2 illustrates a block diagram of one embodiment of a processing system.

FIG. 2 illustrates a block diagram of one embodiment of a processing system 203. Such illustrated processing system 203 may be utilized by the navigation processing system 103 and/or an INS processing system. At least one processor (or at least one processor circuit) 203-1 is communicatively coupled to at least one memory (or at least one memory circuit) 203-2. The processing system 203, however, may be implemented in other ways.

Returning to FIG. 1, the navigation processing system includes a navigation filter 103-1 and a magnetic anomaly map 103-2. The navigation filter 103-1 may be a Kalman filter, a point mass filter, a particle filter, and/or any other type of filter which can be utilized as a navigation filter. The magnetic anomaly map is a map representing variations in the Earth's magnetic field due to crustal variation with respect to position on, e.g., a surface of, the Earth.

The inertial navigation system 104 includes at least one accelerometer and at least one gyroscope and is configured to determine a geographic position of the body 101-1, a velocity of the body 101-1, and/or an attitude of the body 101-1. Such data is configured to be transmitted from the INS 104 to the navigation processing system 103, e.g., the navigation filter.

Figure 3:
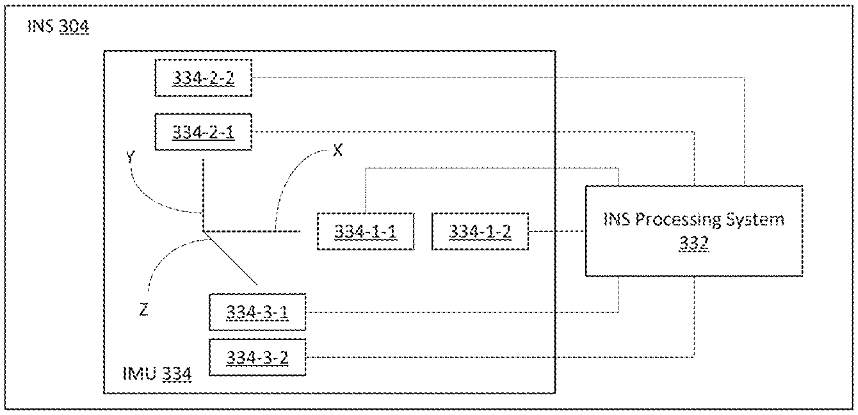
FIG. 3 illustrates a block diagram of one embodiment of the inertial navigation system.

FIG. 3 illustrates a block diagram of one embodiment of the inertial navigation system 304. The INS 304 an inertial measurement unit (IMU) 334 communicatively coupled to an INS processing system (or INS processing circuitry) 332.

Optionally, the IMU 334 includes an accelerometer 334-1-1, 334-2-1, 334-3-1 for measuring an acceleration in each of the three orthogonal axes X, Y, Z. The IMU 334 also optionally includes a gyroscope 334-1-2, 334-2-2, 334-3-2 for measuring an angular rotation rate in each of the three orthogonal axes X, Y, Z. Optionally, the INS processing system 332 may be implemented by the processing system illustrated in FIG. 2; however, the INS processing system 332 may be implemented in other ways. Although the INS processing system 332 and the navigation processing system 103 are illustrated herein as distinct elements for pedagogical purposes, the geographic position determining system 100 may share a single processing system to perform functions of both of the INS processing system 332 and the navigation processing system 103.

The INS processing system 332 is communicatively coupled to each accelerometer 334-1-1, 334-2-1, 334-3-1 and to each gyroscope 334-1-2, 334-2-2, 334-3-2. Using acceleration data from each of such accelerometers 334-1-1, 334-2-1, 334-3-1 and rotation data from each of such gyroscopes 334-1-2, 334-2-2, 334-3-2, the INS processing system 332 is configured to determine the geographic position of the body 101-1, the velocity of the body 101-1, and/or the attitude of the body 101-1.

Returning to FIG. 1, optionally, the geographic position determining system 100 further includes at least one of a vertical measurement device 106. The optional vertical measurement device 106 may be at least one of an altimeter (e.g., a barometric altimeter and/or a radar altimeter) or any other type of device which can be used to determine vertical position, e.g., height 106-1, with respect to a surface or mean sea level 108 of the Earth[1]. The optional vertical measurement device 106 is communicatively coupled to the navigation processing system 103. The data, e.g., about the height 106-1 with respect to the surface of the Earth, from the optional vertical measurement device 106 is configured to be used by the navigation filter 103-1 as aiding data to more accurately determine the geographic position of the body 101-1.

[1] Except for a GNSS receiver or a magnetometer.

Figure 4:
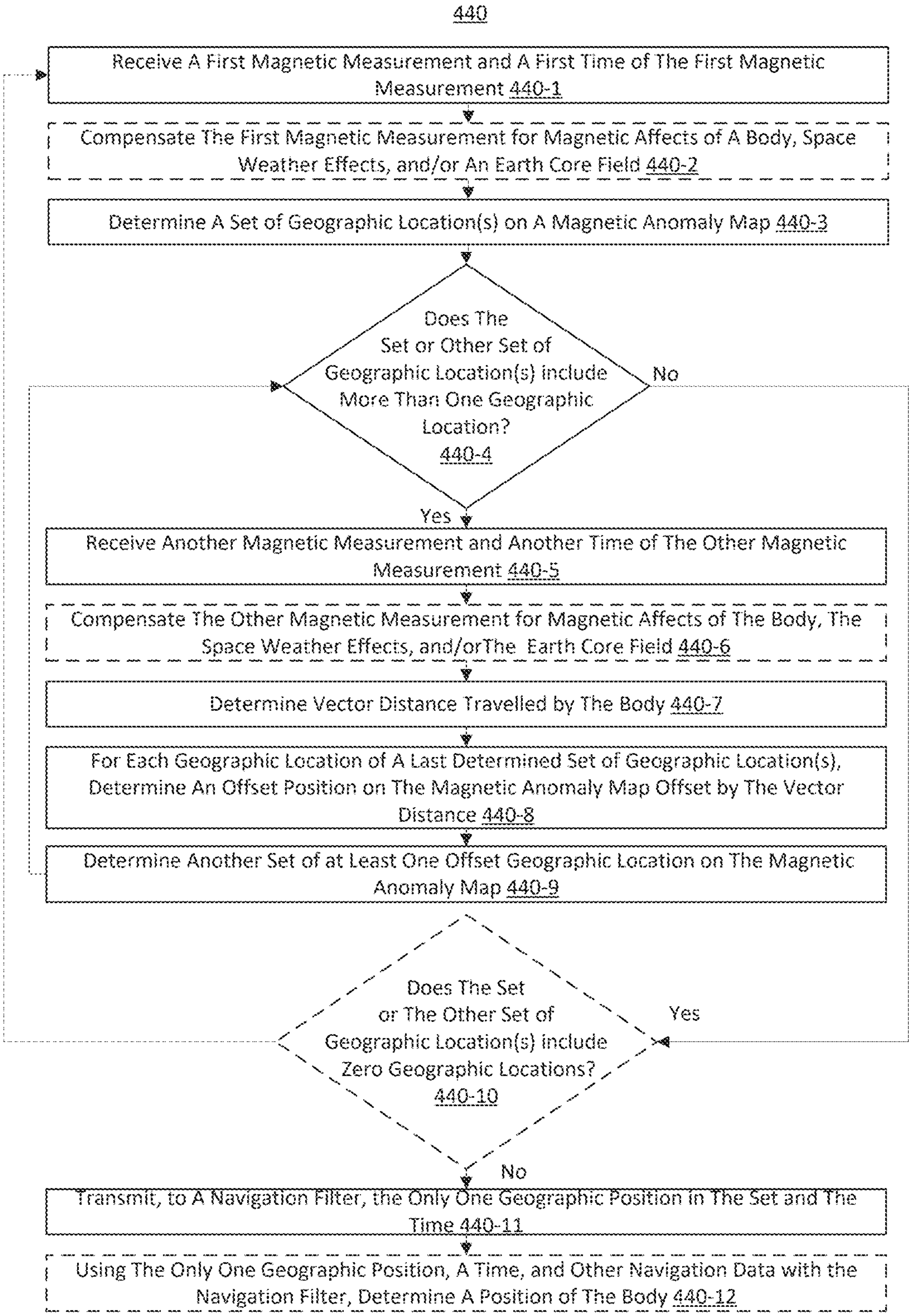
FIG. 4 illustrates a flow diagram of a method of determining geographic position of a body according to embodiments of the invention.

FIG. 4 illustrates a flow diagram of a method 440 of determining geographic position of a body according to embodiments of the invention. To the extent that the methods shown in any of the Figures is described herein as being implemented in an apparatus shown in FIGS. 1, 2, and/or 3, it is to be understood that other embodiments can be implemented in other ways. The blocks of the flow diagrams have been arranged in a generally sequential manner for case of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440-1, a first magnetic measurement is received (e.g., from the magnetometer), and a first time when the first magnetic measurement was made, are received.[2] Optionally, block 440-1 is commenced only upon determining that the optional GNSS receiver is jammed and/or spoofed.

[2] Optionally, such time may be obtained from the time source and/or the optional GNSS receiver if not jammed and/or spoofed.

In optional block 440-2, the first magnetic measurement is compensated for magnetic effects of a body, of space weather, and/or of a core field of the earth to arrive at a more accurate magnetic measurement which reflects a magnetic anomaly, i.e., variations in the Earth's magnetic field due to crustal variation with respect to position on, e.g., a surface of, the Earth. Optionally, body magnetic effects can be determined with a Tolles-Lawson model; the body magnetic affects can be subtracted from the magnetic measurement. Optionally, space weather magnetic field information for different geographic positions may be provided as a forecast from a space weather information source; the space weather magnetic field can be subtracted from the magnetic measurement. Optionally, the core magnetic field of the earth can be determined with a mathematical model, e.g., the World Magnetic Model (WMM); the core magnetic field can be subtracted from the magnetic measurement.

In block 440-3, a set of at least one geographic location on a magnetic anomaly map is generated. Each geographic location on a magnetic anomaly map of the set has a magnetic field strength within a threshold range of the first magnetic measurement or the first compensated magnetic measurement. The threshold range may be user defined and/or a function of compensation technique(s) and/or a characteristic and/or a quality[3] of the device making the magnetic measurements, e.g., the magnetometer. The threshold range may be a numerical range, a standard deviation of the magnetic measurement, and/or any other type of threshold range.

[3] E.g., a noise floor thereof.

In block 440-4, whether the set or another set of at least one geographic location, on the magnetic anomaly map, includes more than one geographic location is determined. If the set of at least one geographic location does not include more than one geographic location, then proceed to block 440-10 or 440-11. If the set of at least one geographic location includes more than one geographic location, then, in block 440-5, another magnetic measurement is received, e.g., from the magnetometer, and another time when the other magnetic measurement was made, is received, e.g., from the optional GNSS receiver if not jammed and/or spoofed and/or the time source.

In optional block 440-6, the other magnetic measurement is compensated for the magnetic effects of the body, of the space weather, and/or of the core field of the earth to arrive at a more accurate magnetic measurement which reflects a magnetic anomaly, i.e., variations in the Earth's magnetic field due to crustal variation with respect to position on, e.g., a surface of, the Earth. Exemplary techniques for performing such compensation are disclosed elsewhere herein.

In block 440-7, a vector distance travelled by the body, between where the other magnetic measurement was made and where the magnetic measurement immediately preceding the other magnetic measurement was made, is determined. Optionally, the vector distance may be used by using geographic position data from the INS and/or the optional GNSS receiver.

In block 440-8, by adding the vector distance to each geographic location of a last determined set of at least one geographic location, an offset geographic position on the magnetic anomaly map is determined for each geographic location of the last determined set of at least one geographic location. In block 440-9, the other set of at least one offset geographic location on a magnetic anomaly map is generated. The other set, of at least one offset geographic location on the magnetic anomaly map, includes each offset geographic location on the magnetic anomaly map which has a magnetic field strength within the threshold range of the other magnetic measurement or the compensated other magnetic measurement. Optionally, the threshold range can be additionally adjusted for uncertainties in the generated vector measurement, e.g., due to drift in the INS. Then proceed to block 440-4.

In optional block 440-10, whether the set or the other set of at least one geographic location includes zero geographic locations is determined. If the set of at least one geographic location includes zero geographic locations, then optionally proceed to block 440-1. If the set of at least one geographic location does not include zero geographic locations, i.e., the set includes only one geographic location, then, in block 440-11, the only one geographic location in the set of at least one geographic location and a time are transmitted to the navigation filter. Optionally, the time is the first time or the time at which the magnetic measurement (corresponding to the only one geographic location) was measured. Using the only one position, the time, and other navigation data, in optional block 440-12, a geographic position of the body is determined with the navigation filter.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

The maps described herein may optionally be in a form of a database. Databases as used herein may be either conventional databases or data storage formats of any type, e.g., data files. Although separate databases are recited herein, one or more of such databases may be combined.

EXEMPLARY EMBODIMENTS

Example 1 includes a method of utilizing a magnetic anomaly measurement to aid in determining a geographic position of a body, the method comprising: receiving a first magnetic measurement and a first time when the first magnetic measurement was made; generating a set of at least one geographic location on a magnetic anomaly map, wherein the set includes each geographic location on the magnetic anomaly map which has a magnetic field strength within a threshold range of the first magnetic measurement; determining whether the set or another set of at least one geographic location, on the magnetic anomaly map, includes more than one geographic location; determining that the set of at least one geographic location includes the more than one geographic location, then receiving another magnetic measurement and another time when the other magnetic measurement was made; determining a vector distance travelled by the body, between where the other magnetic measurement was made and where the magnetic measurement immediately preceding the other magnetic measurement was made; for each geographic location of a last determined set of at least one geographic location, determining an offset geographic position on the magnetic anomaly map by adding the vector distance to each geographic location of the last determined set of at least one geographic location; generating the other set of at least one offset geographic location on the magnetic anomaly map, wherein the other set includes each offset geographic location on the magnetic anomaly map which has a magnetic field strength within the threshold range of the other magnetic measurement; and determining that the set of at least one geographic location does not include the more than one geographic location, then transmitting, to a navigation filter, only one geographic location in the set or the other set and a time.

Example 2 includes the method of Example 1, further comprising compensating the first magnetic measurement by subtracting magnetic effects of the body, of space weather, and/or of a core field of earth.

Example 3 includes the method of Example 2, further comprising compensating the other magnetic measurement by subtracting the magnetic effects of the body, of the space weather, and/or of the core field of the earth.

Example 4 includes the method of any of Examples 1-3, further comprising, using the only one geographic position, the time, and other navigation data and with the navigation filter, determining the geographic position of the body.

Example 5 includes the method of any of Examples 1-4, wherein the time is the first time or a time at which the last magnetic measurement was measured prior to determining a set including the only one geographic location.

Example 6 includes the method of any of Examples 1-5, wherein the vector distance is calculated using geographic position data from an inertial navigation system and/or a global navigation satellite system receiver.

Example 7 includes the method of any of Examples 1-6, wherein determining that the set of at least one geographic location does not include the more than one geographic location, then transmitting, to the navigation filter, the only one geographic location in the set or the other set and a time comprises: determining that the set of at least one geographic location does not include the more than one geographic location, then determining whether the set or the other set includes zero geographic locations; and determining that the set or the other set does not include the zero geographic locations, then transmitting, to the navigation filter, the only one geographic location in the set or the other set and a time.

Example 8 includes a program product comprising a non-transitory processor readable medium on which program instructions are embodied, wherein the program instructions are configured, when executed by at least one programmable processor, to cause the at least one programmable processor to execute a process to utilize a magnetic anomaly measurement to aid in determining a geographic position of a body, the process comprising: receiving a first magnetic measurement and a first time when the first magnetic measurement was made; generating a set of at least one geographic location on a magnetic anomaly map, wherein the set includes each geographic location on the magnetic anomaly map which has a magnetic field strength within a threshold range of the first magnetic measurement; determining whether the set or another set of at least one geographic location, on the magnetic anomaly map, includes more than one geographic location; determining that the set of at least one geographic location includes the more than one geographic location, then receiving another magnetic measurement and another time when the other magnetic measurement was made; determining a vector distance travelled by the body, between where the other magnetic measurement was made and where the magnetic measurement immediately preceding the other magnetic measurement was made; for each geographic location of a last determined set of at least one geographic location, determining an offset geographic position on the magnetic anomaly map by adding the vector distance to each geographic location of the last determined set of at least one geographic location; generating the other set of at least one offset geographic location on the magnetic anomaly map, wherein the other set includes each offset geographic location on the magnetic anomaly map which has a magnetic field strength within the threshold range of the other magnetic measurement; and determining that the set of at least one geographic location does not include the more than one geographic location, then transmitting, to a navigation filter, only one geographic location in the set or the other set and a time.

Example 9 includes the program product of Example 8, wherein the process further comprises further comprising compensating the first magnetic measurement by subtracting magnetic effects of the body, of space weather, and/or of a core field of earth.

Example 10 includes the program product of Example 9, wherein the process further comprises compensating the other magnetic measurement by subtracting the magnetic effects of the body, of the space weather, and/or of the core field of the earth.

Example 11 includes the program product of any of Examples 8-10, wherein the process further comprises, using the only one geographic position, the time, and other navigation data and with the navigation filter, determining the geographic position of the body.

Example 12 includes the program product of any of Examples 8-11, wherein the time is the first time or a time at which the last magnetic measurement was measured prior to determining a set including the only one geographic location.

Example 13 includes the program product of any of Examples 8-12, wherein determining that the set of at least one geographic location does not include the more than one geographic location, then transmitting, to the navigation filter, the only one geographic location in the set or the other set and a time comprises: determining that the set of at least one geographic location does not include the more than one geographic location, then determining whether the set or the other set includes zero geographic locations; and determining that the set or the other set does not include the zero geographic locations, then transmitting, to the navigation filter, the only one geographic location in the set or the other set and a time.

Example 14 includes an apparatus for utilizing a magnetic anomaly measurement to aid in determining a geographic position of a body, the apparatus comprising: a magnetometer; an inertial measurement unit; a time source; and a processing circuitry; wherein the processing circuitry is configured to store a navigation filter and a magnetic anomaly map; wherein the processing circuitry is communicatively coupled to the time source, the magnetometer, and the inertial measurement unit; wherein the processing circuitry is configured to: receive a first magnetic measurement from the magnetometer and a first time from the time source when the first magnetic measurement was made; generate a set of at least one geographic location on the magnetic anomaly map, wherein the set includes each geographic location on the magnetic anomaly map which has a magnetic field strength within a threshold range of the first magnetic measurement; determine whether the set or another set of at least one geographic location, on the magnetic anomaly map, includes more than one geographic location; determine that the set of at least one geographic location includes the more than one geographic location, then receiving another magnetic measurement from the magnetometer and another time, from the time source, when the other magnetic measurement was made; determine a vector distance travelled by the body, between where the other magnetic measurement was made and where the magnetic measurement immediately preceding the other magnetic measurement was made; for each geographic location of a last determined set of at least one geographic location, determine an offset geographic position on the magnetic anomaly map by adding the vector distance to each geographic location of the last determined set of at least one geographic location; generate the other set of at least one offset geographic location on the magnetic anomaly map, wherein the other set includes each offset geographic location on the magnetic anomaly map which has a magnetic field strength within the threshold range of the other magnetic measurement; and determine that the set of at least one geographic location does not include the more than one geographic location, then transmitting, to the navigation filter, only one geographic location in the set or the other set and a time from the time source.

Example 15 includes the apparatus of Example 14, wherein the processing circuitry is further configured to compensate the first magnetic measurement by subtracting magnetic effects of the body, of space weather, and/or of a core field of earth.

Example 16 includes the apparatus of Example 15, wherein the processing circuitry is further configured to compensate the other magnetic measurement by subtracting the magnetic effects of the body, of the space weather, and/or of the core field of the earth.

Example 17 includes the apparatus of any of Examples 14-16, wherein the processing circuitry is further configured to, using the only one geographic position, the time, and data from the inertial measurement unit and with the navigation filter, determine the geographic position of the body.

Example 18 includes the apparatus of any of Examples 14-17, wherein the time is the first time or a time at which the last magnetic measurement was measured prior to determining a set including the only one geographic location.

Example 19 includes the apparatus of any of Examples 14-18, wherein the vector distance is calculated using geographic position data from an inertial navigation system and/or a global navigation satellite system receiver.

Example 20 includes the apparatus of any of Examples 14-19, wherein determining that the set of at least one geographic location does not include the more than one geographic location, then transmitting, to the navigation filter, the only one geographic location in the set or the other set and a time comprises: determining that the set of at least one geographic location does not include the more than one geographic location, then determining whether the set or the other set includes zero geographic locations; and determining that the set or the other set does not include the zero geographic locations, then transmitting, to the navigation filter, the only one geographic location in the set or the other set and a time.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method of utilizing a magnetic anomaly measurement to aid in determining a geographic position of a body, the method comprising:

receiving a first magnetic field strength measurement and a first time when the first magnetic field strength measurement was made;

generating a first set of at least one geographic location on a magnetic field strength anomaly map, wherein the first set includes each geographic location on the magnetic field strength anomaly map which has a magnetic field strength within a threshold range of the first magnetic measurement;

determining whether the first set of at least one geographic location, on the magnetic field strength anomaly map, includes more than one geographic location;

determining that the first set of at least one geographic location includes the more than one geographic location, then receiving second magnetic field strength measurement and second time when the second magnetic field strength measurement was made;

determining a vector distance travelled by the body, between where the second magnetic field strength measurement was made and where the first magnetic field strength measurement was made;

for each geographic location of the first set of at least one geographic location, determining an offset geographic position on the magnetic field strength anomaly map by adding the vector distance to a geographic location of the first set of at least one geographic location;

generating a second set of at least one offset geographic location on the magnetic field strength anomaly map, wherein the second set includes each offset geographic location on the magnetic field strength anomaly map which has a magnetic field strength within the threshold range of the other magnetic measurement; and determining that the first set of at least one geographic location does not include the more than one geographic location, then transmitting, to a navigation filter, only one geographic location in the first set and a time.

2. The method of claim 1, further comprising compensating the first magnetic field strength measurement by subtracting magnetic effects of the body, of space weather, and/or of a core field strength of earth.

3. The method of claim 2, further comprising compensating the second magnetic field strength measurement by subtracting the magnetic effects of the body, of the space weather, and/or of the core field strength of the earth.

4. The method of claim 1, further comprising, using the only one geographic position, the time, and other navigation data and with the navigation filter, determining the geographic position of the body.

5. The method of claim 1, wherein the time is the first time or the second time.

6. The method of claim 1, wherein the vector distance is calculated using geographic position data from an inertial navigation system and/or a global navigation satellite system receiver.

7. The method of claim 1, wherein determining that the first set of at least one geographic location does not include the more than one geographic location, then transmitting, to the navigation filter, the only one geographic location in the first set or the second set and the time comprises:

determining that the first set of at least one geographic location does not include the more than one geographic location, then determining whether the first set includes zero geographic locations; and determining that the first set does not include the zero geographic locations, then transmitting, to the navigation filter, the only one geographic location in the first set and the time.

8. A program product comprising a non-transitory processor readable medium on which program instructions are embodied, wherein the program instructions are configured, when executed by at least one programmable processor, to cause the at least one programmable processor to execute a process to utilize a magnetic anomaly measurement to aid in determining a geographic position of a body, the process comprising:

receiving a first magnetic field strength measurement and a first time when the first magnetic field strength measurement was made;

generating a first set of at least one geographic location on a magnetic field strength anomaly map, wherein the first set includes each geographic location on the magnetic field strength anomaly map which has a magnetic field strength within a threshold range of the first magnetic measurement;

determining whether the first set of at least one geographic location, on the magnetic field strength anomaly map, includes more than one geographic location;

determining that the first set of at least one geographic location includes the more than one geographic location, then receiving second magnetic field strength measurement and a second time when the second magnetic field strength measurement was made;

determining a vector distance travelled by the body, between where the second magnetic field strength measurement was made and where the first magnetic field strength measurement was made;

for each geographic location of the first set of at least one geographic location, determining an offset geographic position on the magnetic field strength anomaly map by adding the vector distance to a geographic location of the the first set of at least one geographic location;

generating a second set of at least one offset geographic location on the magnetic field strength anomaly map, wherein the second set includes each offset geographic location on the magnetic field strength anomaly map which has a magnetic field strength within the threshold range of the other magnetic measurement; and determining that the first set of at least one geographic location does not include the more than one geographic location, then transmitting, to a navigation filter, only one geographic location in the first set and a time.

9. The program product of claim 8, wherein the process further comprises further comprising compensating the first magnetic field strength measurement by subtracting magnetic effects of the body, of space weather, and/or of a core field strength of earth.

10. The program product of claim 9, wherein the process further comprises compensating the second magnetic field strength measurement by subtracting the magnetic effects of the body, of the space weather, and/or of the core field strength of the earth.

11. The program product of claim 8, wherein the process further comprises, using the only one geographic position, the time, and other navigation data and with the navigation filter, determining the geographic position of the body.

12. The program product of claim 8, wherein the time is the first time or the second.

13. The program product of claim 8, wherein determining that the first set of at least one geographic location does not include the more than one geographic location, then transmitting, to the navigation filter, the only one geographic location in the first set or the second set and the time comprises:

determining that the first set of at least one geographic location does not include the more than one geographic location, then determining whether the first set or the second set includes zero geographic locations; and determining that the first set or the second set does not include the zero geographic locations, then transmitting, to the navigation filter, the only one geographic location in the first set and the time.

14. An apparatus for utilizing a magnetic anomaly measurement to aid in determining a geographic position of a body, the apparatus comprising:

a magnetometer;

an inertial measurement unit;

a time source; and a processing circuitry;

wherein the processing circuitry is configured to store a navigation filter and a magnetic field strength anomaly map;

wherein the processing circuitry is communicatively coupled to the time source, the magnetometer, and the inertial measurement unit;

wherein the processing circuitry is configured to:

receive a first magnetic field strength measurement from the magnetometer and a first time from the time source when the first magnetic field strength measurement was made;

generate a first set of at least one geographic location on the magnetic field strength anomaly map, wherein the first set includes each geographic location on the magnetic field strength anomaly map which has a magnetic field strength within a threshold range of the first magnetic measurement;

determine whether the first set of at least one geographic location, on the magnetic field strength anomaly map, includes more than one geographic location;

determine that the first set of at least one geographic location includes the more than one geographic location, then receiving second magnetic field strength measurement from the magnetometer and another time, from the time source, when the second magnetic field strength measurement was made;

determine a vector distance travelled by the body, between where the second magnetic field strength measurement was made and where the first magnetic field strength measurement was made;

for each geographic location of the first set of at least one geographic location, determine an offset geographic position on the magnetic field strength anomaly map by adding the vector distance to a geographic location of the first set of at least one geographic location;

generate the second set of at least one offset geographic location on the magnetic field strength anomaly map, wherein the second set includes each offset geographic location on the magnetic field strength anomaly map which has a magnetic field strength within the threshold range of the other magnetic measurement; and determine that the first set of at least one geographic location does not include the more than one geographic location, then transmitting, to the navigation filter, only one geographic location in the first set and a time from the time source.

15. The apparatus of claim 14, wherein the processing circuitry is further configured to compensate the first magnetic field strength measurement by subtracting magnetic effects of the body, of space weather, and/or of a core field strength of earth.

16. The apparatus of claim 15, wherein the processing circuitry is further configured to compensate the second magnetic field strength measurement by subtracting the magnetic effects of the body, of the space weather, and/or of the core field strength of the earth.

17. The apparatus of claim 14, wherein the processing circuitry is further configured to, using the only one geographic position, the time, and data from the inertial measurement unit and with the navigation filter, determine the geographic position of the body.

18. The apparatus of claim 14, wherein the time is the first time or the second time.

19. The apparatus of claim 14, wherein the vector distance is calculated using geographic position data from an inertial navigation system and/or a global navigation satellite system receiver.

20. The apparatus of claim 14, wherein determining that the first set of at least one geographic location does not include the more than one geographic location, then transmitting, to the navigation filter, the only one geographic location in the first set and the time comprises:

determining that the first set of at least one geographic location does not include the more than one geographic location, then determining whether the first set includes zero geographic locations; and determining that the first set does not include the zero geographic locations, then transmitting, to the navigation filter, the only one geographic location in the first set and the time.

* * * * *